(12) United States Patent
Brown

(10) Patent No.: US 10,019,462 B1
(45) Date of Patent: Jul. 10, 2018

(54) SYSTEM AND METHOD OF HIERARCHICAL ARCHIVE MANAGEMENT

(75) Inventor: Michael R. Brown, London (GB)

(73) Assignee: EMC CORPORATION, Hopkinton, MA (US)

( * ) Notice: Subject to any disclaimer, the term of this patent is extended or adjusted under 35 U.S.C. 154(b) by 264 days.

(21) Appl. No.: 13/341,194

(22) Filed: Dec. 30, 2011

(51) Int. Cl.
G06F 17/30 (2006.01)

(52) U.S. Cl.
CPC .. G06F 17/30244 (2013.01); G06F 17/30073 (2013.01)

(58) Field of Classification Search
CPC ........ G06F 17/30073; G06F 17/30244; G06F 11/1451; G06F 11/1448; G06F 3/0643; G06F 11/1446; G06F 11/1461; G06F 17/30085; Y10S 707/99954; Y10S 707/99955
USPC ................... 707/661, 662, 664, 667
See application file for complete search history.

(56) References Cited

U.S. PATENT DOCUMENTS

| | | | | |
|---|---|---|---|---|
| 6,675,382 B1* | 1/2004 | Foster | ........................ | G06F 8/61 707/999.001 |
| 8,006,111 B1* | 8/2011 | Faibish | ................. | G06F 1/3221 711/114 |
| 8,464,206 B2* | 6/2013 | Jenkins | ............. | G06F 17/30011 717/103 |
| 8,621,222 B1* | 12/2013 | Das | ........................ | H04L 9/321 713/168 |
| 8,782,009 B2* | 7/2014 | Shaath | .............. | G06F 17/30085 707/661 |
| 8,788,464 B1* | 7/2014 | Lola | ................... | G06F 17/30584 707/661 |
| 2003/0191849 A1* | 10/2003 | Leong | ............... | G06F 17/30073 709/229 |
| 2005/0144189 A1* | 6/2005 | Edwards et al. | .............. | 707/102 |
| 2006/0012818 A1* | 1/2006 | Muschkalski | ................ | 358/1.13 |
| 2006/0159325 A1* | 7/2006 | Zeineh | .................... | G06Q 50/24 382/128 |
| 2006/0159367 A1* | 7/2006 | Zeineh | ................. | G02B 21/365 382/276 |
| 2007/0061373 A1* | 3/2007 | Kilday | .................. | G06F 3/0608 |
| 2008/0068673 A1* | 3/2008 | Kolbu et al. | .................. | 358/472 |
| 2008/0101680 A1* | 5/2008 | Abernethy | ............. | G06K 9/033 382/139 |
| 2008/0201552 A1* | 8/2008 | Tokie | ............................ | 711/204 |
| 2008/0229037 A1* | 9/2008 | Bunte | ................. | G06F 11/1451 711/162 |
| 2008/0320319 A1* | 12/2008 | Muller | ................ | G06F 21/6209 713/193 |
| 2009/0006499 A1* | 1/2009 | Mukhi | .............. | G06F 17/30581 |
| 2009/0092309 A1* | 4/2009 | Calman et al. | ................ | 382/137 |
| 2009/0094424 A1* | 4/2009 | Bondurant | ............ | G06F 3/0605 711/161 |
| 2009/0254575 A1* | 10/2009 | Kravets | .................... | H03M 7/40 |
| 2010/0036872 A1* | 2/2010 | Hiraiwa | .............. | G06F 17/3012 707/E17.055 |

(Continued)

*Primary Examiner* — Heather Herndon
*Assistant Examiner* — Merilyn Nguyen
(74) *Attorney, Agent, or Firm* — Peter Jovanovic; Theodore A. Chen; Krishnendu Gupta

(57) ABSTRACT

A method, article of manufacture, and apparatus for managing a computing environment, such as a cloud data repository. In some embodiments, this includes providing a data archive, and relegating data items to a second, long-term data archive. In some embodiments, data items may be converted to an archive format prior to being relegated.

7 Claims, 2 Drawing Sheets

(56) References Cited

U.S. PATENT DOCUMENTS

| | | | |
|---|---|---|---|
| 2010/0036923 A1* | 2/2010 | Byrne et al. ................... | 709/206 |
| 2010/0208976 A2* | 8/2010 | Abernethy et al. ............ | 382/139 |
| 2011/0093471 A1* | 4/2011 | Brockway ......... | G06F 17/30616 |
| | | | 707/747 |
| 2011/0119698 A1* | 5/2011 | Paxton ............... | H04N 7/17336 |
| | | | 725/28 |
| 2011/0252207 A1* | 10/2011 | Janosik et al. ................ | 711/161 |

* cited by examiner

SYSTEM AND METHOD OF HIERARCHICAL ARCHIVE MANAGEMENT

FIELD OF THE INVENTION

This invention relates generally to data systems, and more particularly to systems and methods for organizing and archiving data in data systems.

BACKGROUND OF THE INVENTION

Many computer users, and particularly enterprises having complex data processing and warehousing needs, may have multiple data processing and storage systems, such as databases or DBMSs. These systems may be used to process or access databases or other data sources that are relevant to the business for an extended period of time, whether for active and current business process needs, or for regulatory and other document retention purposes. Accordingly, enterprises frequently maintain older "legacy" systems for some time in order to access and manipulate data, even when that data is used infrequently. Generally, costs and inconvenience are associated with the maintenance of these legacy systems, for example because of ongoing maintenance costs, or ongoing license fees when the legacy system, or the operating system it runs on, is licensed to the enterprise from a third party. In other situations, a legacy system may be unsupported by the third party vendor, so there is significant risk to the enterprise of problems arising with the data system, even if dedicated support personnel are retained by the enterprise, which in itself causes increased costs.

In addition, servers dedicated to these legacy business applications involve costs on the hardware side, with hardware operating costs being incurred for a data system that may be used only very seldomly, if at all. Similarly to the data application running on the servers, the hardware itself may be outdated and unsupported. However, the enterprise may still need the ability to access the underlying data accessed and served by the legacy system, even if simply for compliance or other legal reasons. Accordingly, the enterprise may be unwilling to bear the risk that the data may become effectively unavailable should the supporting hardware or software fail for some reason.

Accordingly, enterprises may wish to implement a system where data from a legacy system will be stored in a manner that doesn't require the legacy system. For example, the enterprise may implement an application decommissioning or application retirement project. In such implementations, the enterprise may convert existing data from a database, such as a relational database, into a data structure such as XML that can be archived and accessed without the need of a particular RDBMS or other application designed specifically to manage the archived data, but at the same time preserving the required information from the legacy system. If a centralized archive system, such as an XML database, is maintained by the enterprise, the legacy application can be decommissioned when the data served by the application is converted to XML and validated. If XML is used, the data can be stored in a self-describing fashion, that is, the data itself contains a description of the structure applicable to the data. In this way, the data will be generally available in the future on an application-neutral basis, without reliance on any existing application or platform technology.

In the area of unstructured data, such as data stored in application files such as word processing or spreadsheet documents, or email messages or user mailboxes, a similar archiving process may be followed in order to reduce the need for legacy applications. For example, the documents may be virtually "printed," that is, converted to a standardized format like PDF or TIF.

While enterprises have the ability to archive data in a way that can be expected to be available indefinitely, this archiving will frequently result in the archiving of all production data. That is, an enterprise may frequently decide given the balancing of costs, risks, processing time, and regulatory compliance, to simply archive all data without making any assessment of whether archiving is necessary. While this increases the costs associated with processing and storing the enterprise's archived data, this further results in greatly increased costs in the event the archived data should need to be retrieved, for example, in litigation or in response to a regulatory investigation. The scope of the original archiving will commonly be expected to result in a vast body of archived material with must be searched and processed. For many enterprises, it may not prove feasible to simply keep all production data, both structured and unstructured, indefinitely, particularly while the amount of data being processed, transmitted, and stored by the enterprise continues to grow.

While conversion to a standards-based format, such as XML, will likely make information available for a much longer time than archiving data in native form (i.e., in the format used directly by the legacy or other application), it can generally be expected that conversion to XML will result in some loss of fidelity from the original data, particularly in the case of unstructured data such as word processing documents, web pages, and emails. For unstructured data, a standards-based format such as PDF/A may increase the fidelity of the archived data to the original native data in comparison to XML, but PDF/A format is not without limitations that will often cause at least some variation between archived data and the original native format data. Even if there is no loss of fidelity, or the data can be losslessly converted between the long-term archive format and the native format, once the data is converted from the native application, it will generally increase overhead and latency to convert archived data back to the native format. This processing and delay occurs as the archiving system determines what the native application is for the data object, determines whether the archived content can be converted back to native format, and then, if possible, performs the conversion. If such conversation back to native is impossible for any reason, the user may be faced with a frustrating situation in which even recently archived content is available only in a format with significant loss of fidelity, and a format which cannot be manipulated by a native application still in use.

There is a need, therefore, for an improved method, article of manufacture, and apparatus for archiving data while limiting the loss of fidelity for data that is more likely to be accessed from archives, and while limiting system downtime and maximizing throughput.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
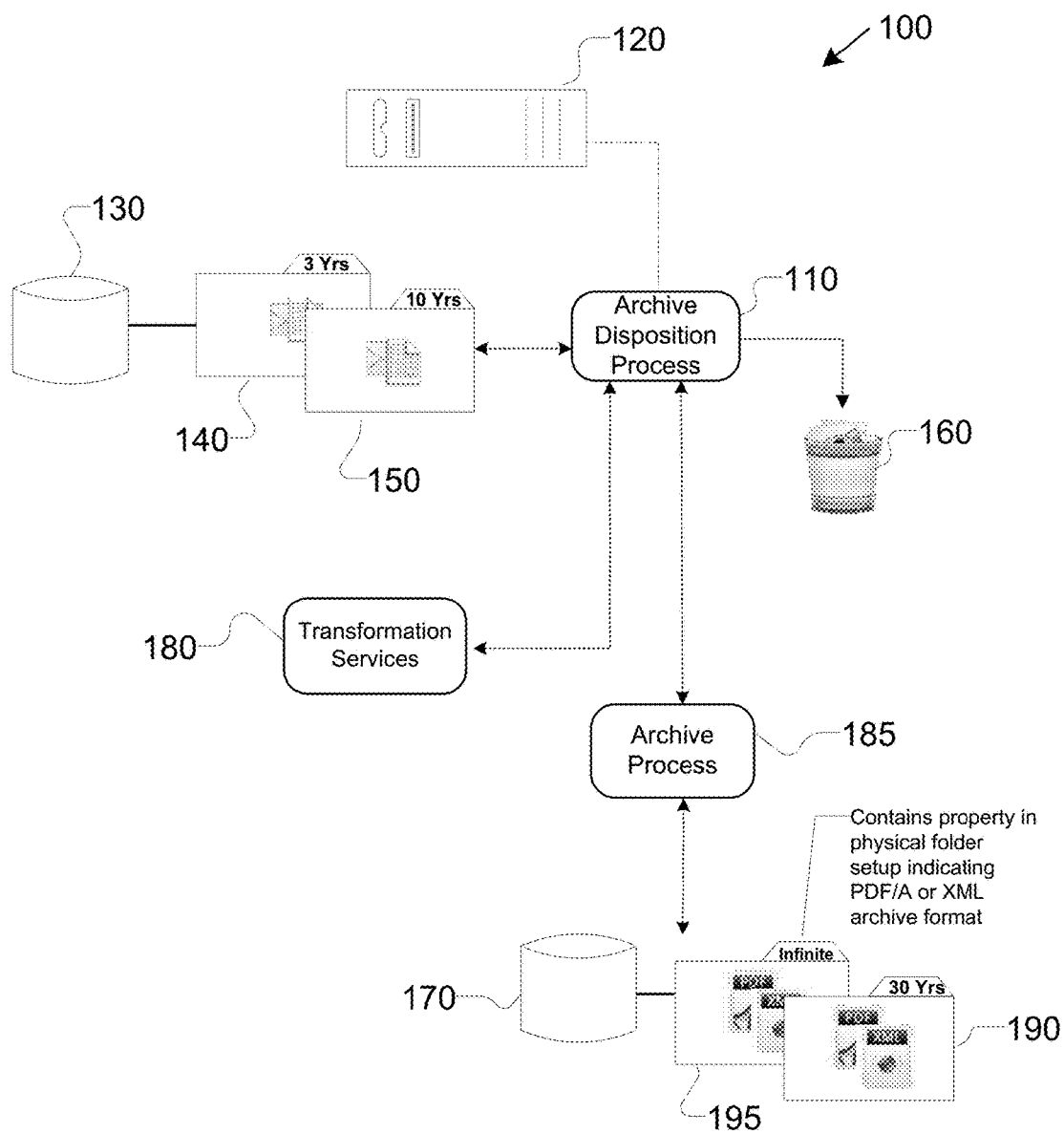
FIG. 1 illustrates a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard-coded in hardware or in firmware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, and particularly data objects, in analog, digital, or other form. Although terms such as document, file, object, etc. may be used by way of example, the principles of the invention are not limited to any particular form of representing and storing data or other information; rather, they are equally applicable to any manner of representing information. Similarly, while reference may be made herein to a database, data system, document storage system, data repository, or similar systems or data collections; reference to one type of these systems should be taken to refer to all such suitable systems unless explicitly stated otherwise.

Traditional content management systems which provide archiving functionality have a relatively rigid process for the archiving of data. It is advisable to archive data in a commonly-used open standard that is likely to be supported in software for a long time in the future. XML and PDF/A are well-suited for the task of providing a relatively "future-proof" format for archiving data. However, the loss of fidelity from the native format is a drawback of these formats. Particularly for data that is relatively more likely to be accessed from the archive, an intermediate archiving stage will balance the need for long-term readability with short-term ease of use.

Embodiments of the present invention provide a hierarchical, or tiered, archiving system or method, by which data may be originally archived in native format, that is, the format used directly by the application that created or otherwise accesses the data. Upon meeting some specified criterion or criteria, the archived data or material may be transferred to a long-term archive. In certain embodiments, when a particular body of data, such as a computer document file, is relegated to a long-term archive, the file format may be changed from the application's native file to a file format more suitable to long-term availability or usability. A body of data for purposes of the instant invention will generally referred to as a "file" or "data object" herein, although the body of data suitable for the instant invention may be sets of data or data collections other than a single computer file, and may be either structured or unstructured. For example, the body of data used with the instant invention may be a database or other data structure or business object, although generally a "file" or "data object" will be referred to herein, and either such reference should be appreciated to refer both to structured and unstructured data, for example both in data structures such as warehouses, or data files or other data objects created or used by an application. The data items may also be, for example, an XML file. For example, an XML "document" object may be created, in some embodiments relating to a scanned paper document, a data file, or some other actual, virtual, or electronic document or file.

Typically, for most purposes a file's native application will be the optimal way to modify or otherwise access a particular data file. Accordingly, it may be anticipated that the modification of a file to a long-term archiving format may very well decrease the short-term usability or convenience of access to the particular body of data to the extent that the long-term format (e.g. XML or PDF/A) is incompatible with the native application.

An embodiment of the invention may provide a group of utilities or other software interface presenting the administrator with a number of options about the establishment of a data archive. One or more of these configuration options may be combined. For example, the administrator may be presented with options for the specific long-term format or formats that will be applied to data files upon their relegation to the long-term archive. The administrator may also be presented with options defining the circumstances or conditions under which one or more data files will be relegated to long-term storage. For example, one possible criterion for the relegation to the long-term archive (or one of several longer-term archives), is simply the period of time that has passed since the time that the data was created. For example, the system could relegate to the long-term archive all data files or other data sets with a creation date greater than three years ago. Alternatively, the system could be configured to relegate to long-term archive data not accessed or modified within some period of time, e.g. data files or objects that haven't been accessed for any production (that is, a non-archive-related, general ongoing business) purpose within the last three years might be relegated to the long-term archive. Another alternative criterion for relegation might be the file or data structure type, for example, all files created with or for a certain native application, for example Microsoft Word 2000, or for a general type of application, such as word processing, may be relegated.

Other criteria may be provided in accordance with the instant invention. For example, a criterion for relegation may be based on the user who created the data object, or the employee of the enterprise that "owned" or was the custodian of the data object. Other possible criteria for relegation may be, for example, a certain period of time after the user's or custodian's termination of employment, a certain data content such as a word or phrase, persons on a distribution list, or other data or metadata field of the data item. In the case of data items that are email messages, recipients or attachment types may serve as suitable relegation criteria. Other criteria for relegation may be created on a project basis, for example data objects may be tagged, linked to, or otherwise indicated as relevant to a certain company product that has shipped, a certain tax year, or a certain litigation matter, for example. When it has been determined that the likelihood of needing to access or produce data objects linked to or associated with a certain project or issue has been reduced, or according to some automatic criteria applied to the project or issue, the data objects associated with the project or issue may be relegated.

Of the criteria above or other possible criteria, none, or one or more criteria may be applied to a set of data or data files (e.g. by directory, database, or other location) to determine which data objects, data structures, sets, or data files will be relegated. In the case of no criteria, the relegation may be performed in an ad hoc manner on selected data structures or files based on selections of the administrator or user. In the case where one or more criteria are applied, these criteria may be applied on a retroactive basis (that is, applied to data structures or files that already meet the criteria) on a going-forward basis (only as to newly-created data or files, or only as regards data or files that newly meet the criteria after the criteria are set), or both (the system may perform relegation on a repository-wide basis as regards existing files, and following the digestion of the existing body of data, it may proceed to apply the relegation criteria to newly-created files or files that newly meet the one or more applicable criteria.

In addition to the selection of criteria for relegation, the archiving administrator or user may also select the archiving format that will be applied to a particular data set or file to be archived. This archive format may be tied to one or more of any of the criteria by which data is selected for archiving. For example, the archive administrator or user may decide to archive all existing data to be archived using one format, and to use a different format for archiving performed on a going-forward basis. Alternatively, the archivist may decide to have certain documents, perhaps word-processing documents or web pages, archived using one format (e.g. PDF/A), and other data, for example spreadsheets or structured data such as databases, using a different format (e.g .XML).

Embodiments of the present invention also allow system administrators or users to designate certain data sets or data files as candidates for relegation according to a specified archive scheme, or according to one or more of several archive criteria, at the time of creation of the data object or during its production use. For example, a user creating a data file may know, at the time that the data file is created, that the data file is very unlikely to be accessed again for any production reason (i.e. for a reason relevant to the ongoing conduct of the enterprise), but rather is being created and must be retain solely for regulatory compliance purposes. Perhaps it is known that the relevant laws or regulations provide that the regulatory authority may demand records of the type being created, but in fact the regulatory authority rarely or never does so.

Alternatively, a user may create a data object or file that may be relevant to a certain company matter that could conceivably become the subject of litigation. It may be thought that it is unlikely that such a lawsuit will be filed, or if such a suit should be filed, it may be estimated that the document is unlikely to be relevant or discoverable. In any such situation where a data object is unlikely to be needed for production purposes, or is unlikely to be needed in native form for some other predicted reason, the user creating the data object may designate the object as one that should be archived by a certain date, or that should be relegated to the long-term archive on a certain date or according to user-specified criteria. Identifying that a data object is a candidate for relegation to long-term archiving may be done by tagging the data object in a document repository, document retention system, or other database; alternatively it may be done in the data object itself using a flag, flag bit, dummy variable, or some other data field or indicator internal to the data object, or one that references or pertains to the data object, including by self-reference.

In another embodiment of the invention, data objects may be identified by users or administrators as pertaining to a certain subject matter or regulatory field, such as human resources or tax. Relegation criteria may then be applied to data objects based on their regulatory field, either independently or in conjunction with another criterion such as length of time in the short-term archive. Separate criteria may also be applied to delete data objects from the long-term archive (that is, eliminate any archived instance of the data object), when the data object is no longer needed for any purpose or the document retention policies of the enterprise no longer dictate that the data object be retained, that is, the long-term archive need not necessarily be a permanent archive, although it may be.

In terms of the implementation of the above criteria, embodiments of the invention provide for a thread, daemon, application, or other process (including such processes running in background at all times, or at times other than peak-load) which scans a certain data storage location or resource for data objects meeting criteria for relegation. Alternatively, or in addition to such processes, relegation may be performed based on scans executed by users or automatically, such as during periods of low utilization, maintenance, or downtime. These relegation processes, whether automatic, scheduled, or performed ad hoc, may coincide with certain events, such as anniversaries of the completion of a project or issue, product launch, product end-of-life, tax year, regulatory event or requirement, or other suitable criteria.

FIG. 1 illustrates a data system in accordance with some embodiments.

The illustration includes an aspect of a system 100 in an embodiment to provide tiered or hierarchical archiving. Generally, archive disposition process 110 is the abstract implementation of the business logic and archiving processes suitable for the enterprise, regulatory/legal area, and/or type of data encountered and created by the enterprise or business unit. These processes may be encoded or programmed onto or with archive server 120 by the archive administrator. Certain embodiments may also provide for designation of archive period and relegation criteria by a data item's creator or other end-user or document custodian. Server 120 may be running continuously or nearly continuously making disposition determinations as to content according to stored or programmed business processes and policies. Short- to mid-term archive storage element 130 contains and represents all data associated with archived content, which has been archived for the relatively near-term according to business processes and policies implemented by archive server 110. The data stored on data storage element 130 will contain, in some embodiments, all data associated with the archived material, both content data and metadata.

Within relatively near-term archive 130, data may be organized, in certain embodiments, in folders or directories 140 and 150 according to the retention period, or native-format retention period, applicable to the data in accordance with business processes and policies. For example, in certain embodiments data may be stored in a 3-year directory 140, or 10-year directory 150, or in other comparable retention-period or criteria directories not depicted. Upon the passage of the relevant retention period (e.g. 3 or 10 years, as applicable according to directory location 140 or 150), the content archived in data storage element 130 may be examined or tagged by archive server 120 executing archive disposition process 110 in order to implement the appropriate relegation or deletion. For example, items tagged for or stored in a directory 140 indicating an initial archive period of three years may be tagged for a second, longer-term period of archiving, such as ten years, or permanent/indefinite archiving. Archive disposition process 110 may implement the programmed business policies based on the archived data's content, metadata, or other archive-specific tags, metadata, directory location, or other suitable identifier, quality, or feature. For example, for a particular piece of data (such as a data structure, business object, or file/document), archive disposition process 110 may be instructed or may determine to permanently delete the data item, represented in the abstract by trash element 160, although it will be appreciated in many embodiments such movement to trash will not correspond to an actual or virtual movement of a data item to particular storage (such as a desktop "Deleted Items" directory), but instead may represent the actual deletion of a data item, for example by elimination of file system reference/pointer/address, immediate or eventual overwriting, or other virtual, practical, or absolute elimination of data.

In the event that data archived in first archive 130 is identified by archive disposition process 110 as being data that is to be relegated or promoted to long-term archive 170 (which may in some embodiments be a permanent or indefinite archive), archiving disposition process 110 will transmit or write data to archive process 185. In certain embodiments, the relegation of data from relative short-term archive 130 to relative long-term archive 170 may be done in-place, that is, archive 130 and archive 170 will exist simultaneously on the same physical or virtual storage, and long-term archived data will exist side-by-side with short-term archived data, and data may be converted to long-term archiving while occupying in part the same storage occupied by the data item prior to relegation. In many embodiments, however, long-term archive 170 will utilize or be implemented on lower-tier storage, for example storage which may be less expensive because it is remote, slower, not random-access, or otherwise is less convenient or less readily-available than the storage used for relative near-term archive 130.

In the event that a data item is identified for long-term archiving, the data item may be transformed to a format suitable for long-term archive 170. In some embodiments this will involve converting the data item from native or legacy format to XML or PDF/A format. This conversion may be accomplished by transformation module 180, which may be run on archive server 120 or an alternative server or processor not depicted. Upon conversion to long-term format, the resulting data item may be passed back to archive process module 110 for delivery to archive process module 190. Archive process module may then store the converted data item in a retention-designation directory appropriate for the data item as dictated by the business policies applied to the data item. For example, the data item may be stored in a directory or storage location indicating 30-year retention by placement or virtual placement in 30-year directory 190, or the converted data item may be relegated to indefinite retention by placement or virtual placement in indefinite-retention directory 195. The storage of data items in long-term archive 170 may further be organized according to the long-term archive format, for example, a certain directory in indefinite archive 195 may be designated for storage of XML data items. A different directory may be designated for storage of PDF/A data items. Depending on the business policies of the enterprise, in some embodiments relegation to long-term archive 170 may take place without conversion to an archive format by transformation module 180. Alternatively, in some embodiments or as regards certain data items conversion to archive format by transformation module 180 may occur prior to placement in short-term archive 130. Transformation module 180 may also transform data items archived in a first archive format in archive 130 to a second archive format more suitable for longer-term storage in data archive 170.

Figure 2:
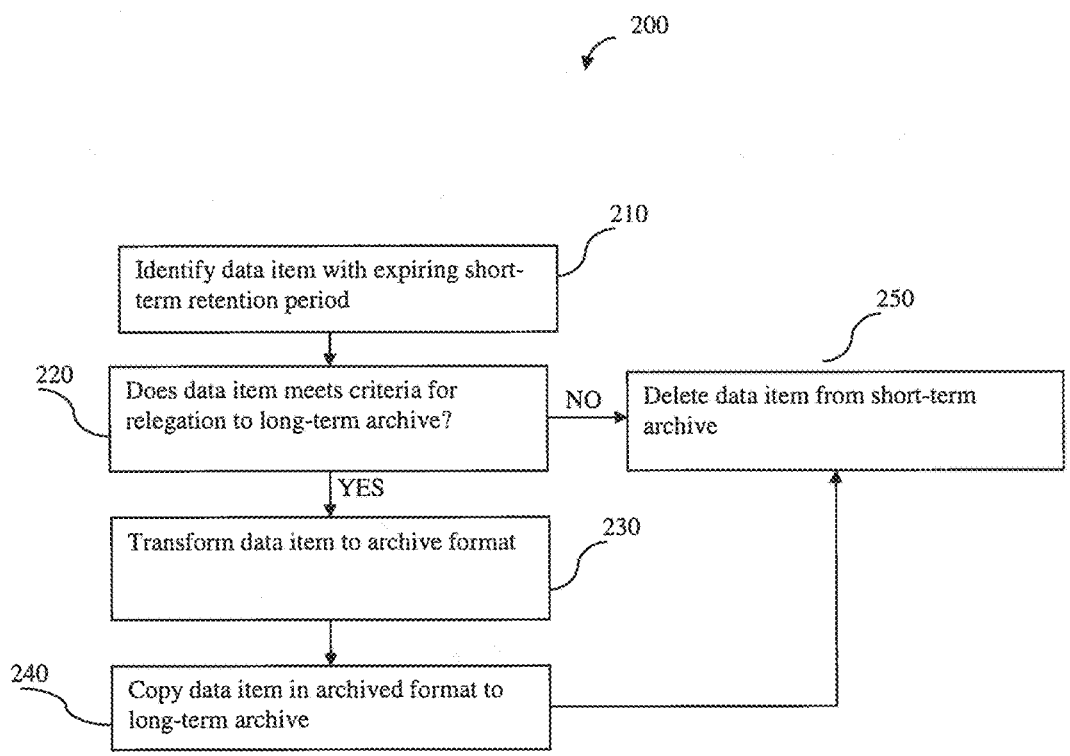
FIG. 2 is a flowchart of a method of providing a hierarchical archive in accordance with some embodiments.

FIG. 2 illustrates a process flow for certain embodiments of the invention. This process flow 200 may be implemented, for example, as part of archive process module 110 running on archive server 120 of FIG. 1. Archive process 200 may first at step 210 identify data items having expiring or expired short-term archiving retention periods. This process 210 may be performed as a background process, or may alternatively or in addition be performed manually or at scheduled times according to the administrator's wishes and the demands of the enterprise. For each data item meeting criteria for removal from the short-term archive, the process may then determine at step 220 whether the data item is a candidate for or has been otherwise selected for relegation to the long-term archive based on suitable criteria. If the data item is not a candidate for relegation the data item may be deleted from the short-term archive at step 250. If, alternatively, the data item is a candidate for relegation to the long-term archive, the data item may be converted to an appropriate long-term archive format (e.g. XML, PDF/A, or other suitable format) at step 230. Following this conversion, the data item in its long-term archive format may be copied to the long-term archive, indicated by step 230. Following the storage of the data-item in the long-term archive, the data item may be deleted from the short-term archive, step 250.

For the sake of clarity, the processes and methods herein have been illustrated with a specific flow, but it should be understood that other sequences may be possible and that some may be performed in parallel, without departing from the spirit of the invention. Additionally, steps may be subdivided or combined, or processes may invoke other processes to handle certain tasks. References herein to "services," "processes," "methods," "tasks," and similar terms should be understood as encompassing services, methods, applications, applets, functions, modules, daemons, scripts, tasks, and other computer processes, however denominated. While some processes or methods may be described as "expecting," "desiring," or "accepting" certain information or results, or more generally performing an action (e.g. "obtaining"), it will be appreciated by those skilled in the art that that these processes need not be sentient or have consciousness or agency, rather, anthropomorphic language indicating expectations or wishes is intended only to illustrate that the process or method may be designed to process or use certain types of arguments, or data having certain qualities or types, and that other arguments or data may result in error, failure, exception, overflow, abnormal termination, abend, or "crash;" or otherwise unexpected, inaccurate, undesirable, or suboptimal results or output. As disclosed herein, software written in accordance with the present invention may be stored in some form of computer-readable medium, such as memory or CD-ROM/optical media, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers, processors, or partitions such that, as a whole, they perform the functions of the components identified herein; i.e. they take the place of a single computer. Various functions described above may be performed by a single process or groups of processes, on a single computer or distributed over several computers. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A computer-implemented method for selectively archiving data, the method comprising:
    accessing a short-term archive;
    providing a long-term archive;
    storing one or more data items in the short-term archive for a native-format retention period, wherein in the data items are stored in a native application format of the data items, wherein the data items are stored in the short-term archive in various directories associated with various native-format retention periods;
    selecting at least one of the one or more data items according to a first relegating criteria;
    converting at least one of the selected data items to first archive format suitable for long-term archiving, wherein the first archive format is not the native application format, wherein the first archive format limits loss of fidelity of the at least one selected data items;
    copying at least one of the converted data items to a first directory on the long-term archive, wherein the first directory is associated with the first archive format;
    storing one or more new data items in the short-term archive;
    selecting at least one of the one or more new data items according to a second relegating criteria;
    converting the at least one of the one or more new data items to a second archive format suitable for long-term archiving, where the second archive format is different than the first archive format, wherein the second archive format limits loss of fidelity of the one or more new data items; and
    copying the at least one of the one or more new data items to a second directory on the long-term archive, wherein the second directory is associated with the second archive format.

2. The method as recited in claim 1 further comprising the step of deleting the at least one selected data items from the short-term archive.

3. The method as recited in claim 2, wherein the first relegating criteria are selected by an archive administrator.

4. The method as recited in claim 1, wherein at least one of the first relegating criteria is a native application used to create or maintain the one or more data items.

5. The method as recited in claim 1, wherein at least one of the first relegating criteria is an amount of time since a last access of the one or more data items.

6. A system for selectively archiving data, comprising at least one storage device and a processor configured to:
    access a short-term archive;
    provide a long-term archive;
    storing one or more data items in the short-term archive for a native-format retention period, wherein in the data items are stored in a native application format of the data items, wherein the data items are stored in the short-term archive in various directories associated with various native-format retention periods;
    select at least one of the one or more data items according to a first relegating criteria;
    convert at least one of the selected data items to first archive format suitable for long-term archiving, wherein the first archive format is not the native application format, wherein the first archive format limits loss of fidelity of the at least one selected data items;
    copy at least one of the converted data items to a first directory on the long-term archive wherein the first directory is associated with the first archive format;
    store one or more new data items in the short-term archive;
    select at least one of the one or more new data items according to a second relegating criteria;
    convert the at least one of the one or more new data items to a second archive format suitable for long-term archiving, where the second archive format is different than the first archive format, wherein the second archive format limits loss of fidelity of the one or more new data items; and
    copy the at least one of the one or more new data items to a second directory on the long-term archive, wherein the second directory is associated with the second archive format.

7. A computer program product for selectively archiving a data object comprising a non-transitory computer-readable medium having program instructions embodied therein for:
    accessing a short-term archive;
    providing a long-term archive;
    storing one or more data items in the short-term archive for a native-format retention period, wherein in the data items are stored in a native application format of the data items, wherein the data items are stored in the short-term archive in various directories associated with various native-format retention periods;
    selecting at least one of the one or more data items according to a first relegating criteria;
    converting at least one of the selected data items to first archive format suitable for long-term archiving, wherein the first archive format is not the native application format, wherein the first archive format limits loss of fidelity of the at least one selected data items;

copying at least one of the converted data items to a first directory on the long-term archive, wherein the first directory is associated with the first archive format;

storing one or more new data items in the short-term archive;

selecting at least one of the one or more new data items according to a second relegating criteria;

converting the at least one of the one or more new data items to a second archive format suitable for long-term archiving, where the second archive format is different than the first archive format, wherein the second archive format limits loss of fidelity of the one or more new data items; and copying the at least one of the one or more new data items to a second directory on the long-term archive, wherein the second directory is associated with the second archive format.

\* \* \* \* \*